ID [19]

United States Patent
Memmel

[11] Patent Number: 5,595,276
[45] Date of Patent: Jan. 21, 1997

[54] CLUTCH DISC WITH TORSIONAL VIBRATION DAMPER

[75] Inventor: Klaus Memmel, Gädheim, Germany

[73] Assignee: Fichtel & Sachs AG, Schweinfurt, Germany

[21] Appl. No.: 398,122

[22] Filed: Mar. 3, 1995

[30] Foreign Application Priority Data

Mar. 5, 1994 [DE] Germany .................. 44 07 394.1

[51] Int. Cl.$^6$ ............................... F16D 13/64; F16D 3/66
[52] U.S. Cl. .................... 192/213.12; 192/213.22
[58] Field of Search ............................ 192/213.1, 213.11, 192/213.12, 213.22; 464/68

[56] References Cited

U.S. PATENT DOCUMENTS

| | | | |
|---|---|---|---|
| 4,883,156 | 11/1989 | Rohrle et al. .................. | 192/213.12 |
| 4,899,862 | 2/1990 | Graton et al. . | |
| 4,998,608 | 3/1991 | Raab et al. . | |
| 5,238,096 | 8/1993 | Ament et al. .................. | 192/213.12 |
| 5,240,458 | 8/1993 | Linglain et al. ................ | 192/213.12 |
| 5,246,398 | 9/1993 | Birk et al. .................... | 192/213.12 |

FOREIGN PATENT DOCUMENTS

| | | |
|---|---|---|
| 3922730 | 1/1991 | Germany . |
| 2248484 | 4/1992 | United Kingdom . |
| 2254398 | 10/1992 | United Kingdom . |
| 2258515 | 2/1993 | United Kingdom . |

*Primary Examiner*—Rodney H. Bonck
*Attorney, Agent, or Firm*—Nils H. Ljungman and Associates

[57] ABSTRACT

A clutch disc with a torsional vibration damper for motor vehicle clutches, including a hub for non-rotational mounting on a transmission shaft, a hub disc which is located on a toothed portion with a range of rotation on the hub, cover sheets on both sides of the hub disc which are non-rotationally connected to one another and one of which supports the friction linings, energy storing devices for a load damper in apertures of the hub disc and of the cover sheets, an idle damper with cover plates on both sides of a hub flange which is firmly connected to the hub, whereby the non-rotational drive of the two cover plates with respect to the hub disc is accomplished by means of axially oriented tabs of at least one cover plate which are circumferentially engaged without clearance or play in recesses of the hub disc, an axially-acting spring as a part of the load damper, and an entrained or dragged friction device located between one of the cover sheets and the idle damper, consisting of a control plate with axial projections which are engaged in circumferentially larger apertures of the hub flange and are circumferentially offset with respect to the tabs. By means of the spring of the load damper, the cover plate of the idle damper, i.e. the cover plate facing the control plate, can be brought into a non-positive connection with the control plate, and the latter in turn can be brought into a non-positive connection with the corresponding cover sheet.

7 Claims, 4 Drawing Sheets

CLUTCH DISC WITH TORSIONAL VIBRATION DAMPER

BACKGROUND OF THE INVENTION

1. Field of the Invention

The present invention generally relates to a clutch disc with a torsional vibration damper for motor vehicle clutches, including: a hub for being non-rotational mounted on a transmission shaft; a hub disc located on a toothed portion with a range of rotation on the hub; cover sheets or cover plates on both sides of the hub disc which are non-rotationally connected to one another, one of the cover sheets supporting friction linings; energy storing devices for a load damper, the energy storing devices being disposed in apertures of the hub disc and Of the cover sheets, an idle damper with cover plates on both sides of a hub flange which is firmly connected to the hub; the non-rotational drive of the two cover plates with respect to the hub disc being accomplished by means of axially oriented tabs of at least one cover plate, and the tabs are circumferentially engaged, without clearance or play in, recesses of the hub disc; an axially-acting spring as a part of the load damper; and an entrained or dragged friction device located between one of the cover sheets and the idle damper, including a control plate with axial projections being engaged in circumferentially larger apertures of the hub flange and being circumferentially offset with respect to the tabs.

2. Background Information

German Patent No. 39 22 730 A1 discloses a clutch disc such as that discussed above, with an idle damper located both between two cover sheets located on the hub and laterally in relation to the hub disc. This idle damper has: a hub flange which is non-rotationally fastened to the hub; and cover plates on both sides, on which there are axially-oriented tabs. The tabs, by means of which the cover plates are non-rotationally engaged with one another, extend without play or clearance in the circumferential direction into apertures of the hub disc. As soon as the cover sheets, with deformation of the energy storage devices for the load damper, are moved out of position relative to the hub disc, there is at least some degree of friction between one of the cover sheets and the corresponding cover plate, the level of which is a function of the strength of a first spring which acts axially and corresponds to the load damper.

In contrast, the axial projections of the control plate in the hub flange of the idle damper are guided with clearance in the circumferential direction, so that only a relative rotation of the cover sheets, and thus of the control plate, relative to the hub flange, need take place before there is a synchronized movement between the control plate and the hub flange. During the first phase of movement of the control plate, the control plate consequently has a surface in frictional contact with the corresponding cover plate of the idle damper, but, during the second phase of movement, it is in similar contact with the corresponding cover sheet. The level of friction thereby generated is a function of the strength of a second, axially-acting spring which is located between the control plate and the corresponding cover plate.

For the idle damper, there is also a friction disc which is located between the cover sheet and the corresponding cover plate, and which penetrates the cover plate with a ring-shaped shoulder, which brings it into contact against the hub flange with a friction force which is a function of the strength of an additional spring located on the other side of the hub disc.

Since, on known clutch discs, for the idle damper and for the load damper, there are three different friction devices, each with a corresponding spring, the expense for components on such torsional vibration dampers can be relatively high. Moreover, since the above-mentioned components must usually be located axially in relation to one another to perform their function, the torsional vibration damper must often necessarily be quite wide.

OBJECT OF THE INVENTION

An object of the present invention is therefore to design a torsional vibration damper for a clutch disc so that, with minimal expense for components and the smallest possible width, it is possible to perform the friction functions of both the idle damper and the load damper.

SUMMARY OF THE INVENTION

The above object, among others, can be achieved by means of an arrangement in which, according to at least one preferred embodiment of the present invention: by means of the spring of the load damper, the cover plate of the idle damper (i.e. the cover plate facing the control plate) can be brought into a non-positive, or frictionally engaged, connection with the control plate, and the latter in turn can be brought into non-positive, or frictionally engaged, connection with the corresponding cover sheet.

By means of the measure of bringing the axially acting spring of the load damper into an active connection with the control plate by means of the cover plate of the idle damper, and locating the control plate between the cover plate of the idle damper and the corresponding cover sheet, the control plate essentially used both to generate an idle friction, which is essentially generated only after a specified relative rotation of the cover plates with respect to the hub flange (which is therefore called "entrained friction" or "dragged friction" herebelow), and also to generate a load friction.

The entrained friction is essentially generated when the control plate, after a relative movement with respect to the hub flange of the idle damper, is brought into an interlocking connection with the idle damper by means of its projections, and between the cover sheet and the cover plate, which are moved under these conditions in synchronization with one another, is forced to execute a relative rotation, by means of which friction is generated on both sides of the control plate. During the transition from idle operation to load operation, the cover plates of the idle damper come into interlocking contact with the hub disc, which results in a relative movement of the hub disc with respect to the cover sheets, and thus also with respect to the control plate located between one of the cover plates and the corresponding cover sheet. The load friction is thereby generated.

As disclosed herebelow, the control plate can also be used, in addition to the functions described above, to generate a basic friction which is active during the idle operation, as a result of the engagement of the control plate, by means of the shoulder, against the hub flange of the idle damper. During idle operation, and regardless of whether it is moved in synchronization with the cover sheet and cover plate, or when the entrained friction is active, with movement relative to the latter, the control plate essentially always executes a relative movement with respect to the hub flange, so that the basic friction is constantly applied.

Because the basic friction, entrained fraction, and load friction are exerted essentially only by the control plate, the torsional vibration damper can be designed so that it is particularly compact in the axial direction.

Also disclosed herebelow is an advantageous location for the attachment of the axial projections of the control plate, since in this area of the corresponding cover plate and of the hub flange, there is sufficient space for an easy placement of the recesses in which the projections will come to be located. A design of the control plate which differs from that just described is also disclosed herebelow.

The above discussed embodiments of the present invention will be described further hereinbelow with reference to the accompanying figures. When the word "invention" is used in this specification, the word "invention" includes "inventions" that is, the plural of "invention" By stating "invention" the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

In summary, one aspect of the invention resides broadly in a clutch disc for a motor vehicle clutch, said clutch disc comprising: first cover plate means; second cover plate means; means for substantially fixedly connecting said first and second cover plate means with respect to one another; hub means; said hub means having means for connecting with a transmission of a motor vehicle; hub disc means being rotatably mounted about a rotational axis and being disposed about said hub means; means for permitting rotational displacement of said hub disc means and said hub means with respect to one another, about said rotational axis; load damper means; idle damper means; friction means disposed between at least one of said first and second cover plate means and said idle damper means; spring means configured for acting in a direction generally parallel to said rotational axis; hub flange means being fixedly connected with said hub means; said idle damper means comprising control plate means for engaging with said hub flange means; and said spring means having means for biasing at least one of said first and second cover plate means into frictional engagement with said control plate means.

BRIEF DESCRIPTION OF THE DRAWINGS

The present invention is explained in greater detail below with reference to the embodiment illustrated in the accompanying drawings, wherein.

DESCRIPTION OF THE PREFERRED EMBODIMENT

Figure 1:
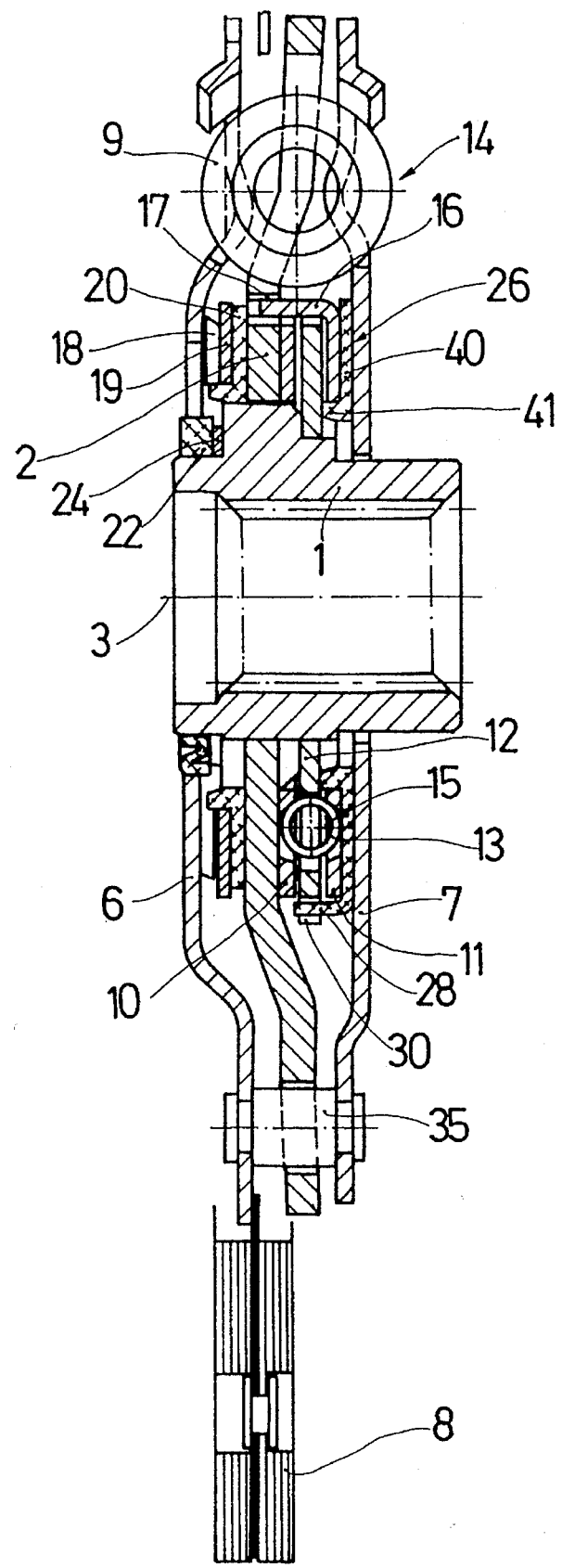
FIG. 1 shows an overall longitudinal section through a clutch disc that has an idle damper with a cover plate, as well as having a control plate with axial projections.
Figure 2:
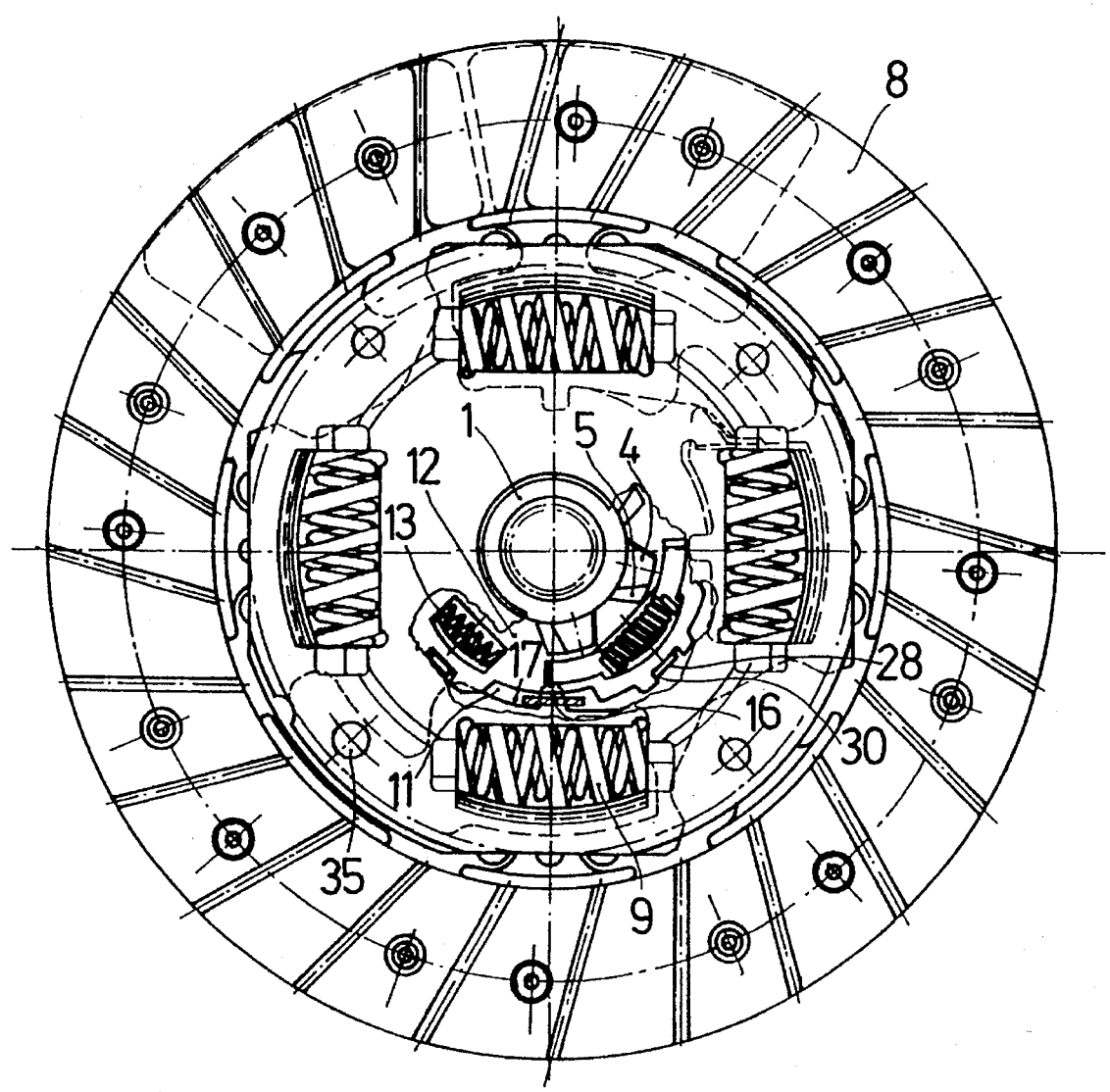
FIG. 2 shows a head-on view with individual areas in cross section (i.e. cut-away views)
Figure 3A:
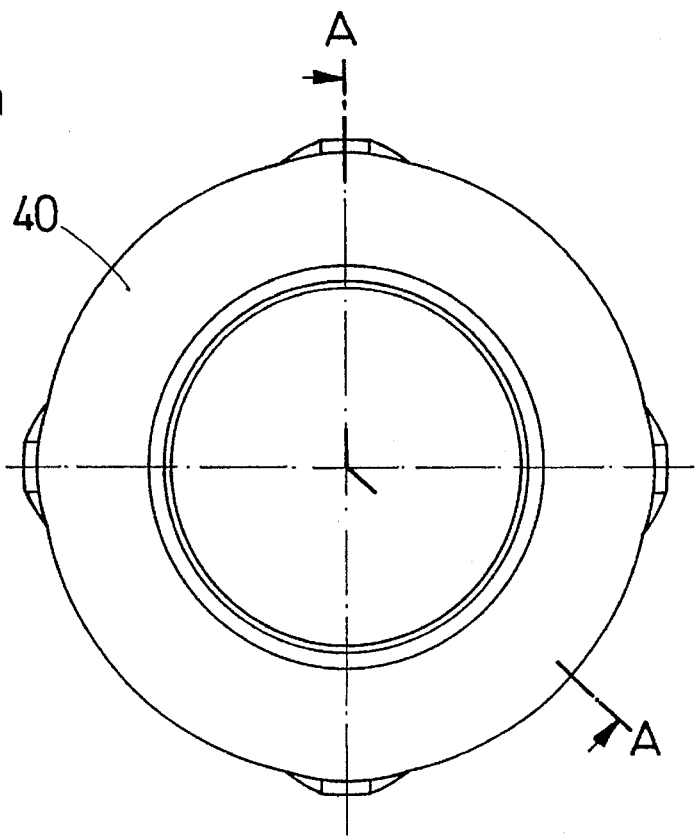
FIGS. 3 and 3a respectively show a sectional view and a plan view of the control plate.
Figure 3:
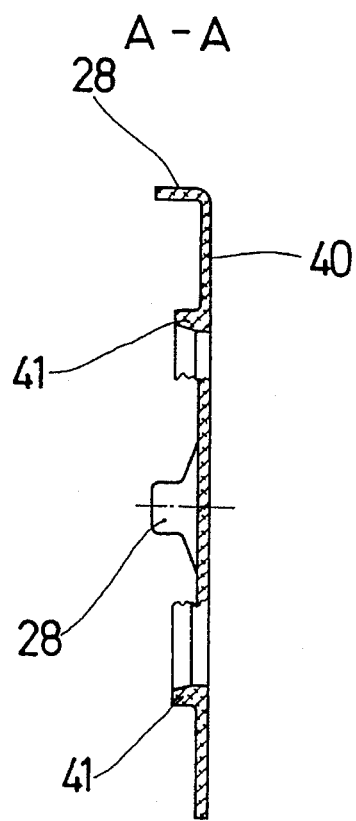

FIGS. 1 and 2 show the overall layout and configuration or situation of a clutch disc in accordance with a preferred embodiment of the present invention. The clutch disc, by means of its hub 1, is preferably fastened non-rotationally with respect to a transmission shaft (not shown), but so that it can move axially, and is rotatable about an axis of rotation 3. Hub 1 is preferably connected circumferentially to the hub disc 2 by means of a toothed portion 4 with the range of rotation 5 (see FIG. 2). On both sides of the hub disc 2, there are preferably cover sheets, or cover plates, 6 and 7, which are preferably non-rotationally connected to one another in the vicinity of their outside diameter by means of connecting rivets In accordance with at least one preferred embodiment of the present invention, a plurality of uniformly distributed tooth portions 4 will preferably extend radially from hub 1. Preferably, hub disc 2 will be provided with a plurality of suitable apertures that can accommodate corresponding tooth portions 4, and these apertures will preferably be so dimensioned as to permit each tooth portion 4 to displace circumferentially, with respect to each aperture, within a range of rotation, or rotational displacement, 5. Accordingly, in accordance with at least one preferred embodiment of the present invention, the hub 1 and hub disc 2 will essentially be able to displace rotationally with respect to one another, but only through the range of rotation 5. This range of rotation 5, with respect to each tooth portion 4 and each corresponding aperture, can conceivably be governed by the placement of radial walls at each aperture, such that, upon a given relative rotational displacement of the hub 1 and hub disc 2 with respect to one another over the range of rotation 5, each tooth portion 4 will come into contact with a radial wall of its corresponding aperture, and will thus not be able to move further rotationally with respect to the aperture.

In apertures of the cover sheets 6 and 7, and in apertures of the hub disc 2, there are preferably energy storage devices 9 which are part of a load damper 14. Preferably fastened to the outside circumference of the cover sheet 6 are friction linings 8. Both cover sheets 6 and 7 are preferably rotationally guided by means of a bearing ring 22 on the inside diameter of the cover sheet 6, in a radial direction with respect to the hub 1.

Figure 4:
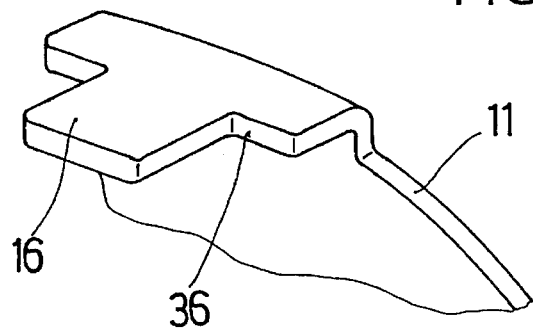
FIG. 4 shows a partial plan view of the cover plate facing the control plate.

Between the hub disc 2 and the cover sheet 7, there is preferably an idle damper 15 which has two cover plates 10 and 11, a hub flange 12 and energy storage devices 13. The hub flange 12 is thereby preferably non-rotationally fastened to the hub 1, and all the rotating components are preferably axially fixed in relation to it. In the vicinity of its outside circumference, and radially outward from the energy storage devices 13, there are preferably tabs 16 which are bent axially, and which preferably project into notches 17 of the hub disc 2, where they preferably create a rotational connection with essentially no clearance in the circumferential direction. The same tabs 16 are also preferably in firm circumferential contact on that cover plate 10 which is further inside, and viewed in the axial direction (see also FIG. 4) the cover plate 11 is preferably in contact, by means of support edges 36, with the cover plate 10, and both cover plates 10 and 11 are preferably axially supported on the hub disc 2.

The axial support force can thereby preferably be generated by spring 18, which is preferably located between the cover sheet 6 and a ring 19, which is preferably connected non-positively (i.e. in a frictionally engaged manner) but so that it can move axially, to the cover sheet 6, and preferably exerts pressure on a friction ring 20 which is supported, for its part, on the hub disc 2. The axial force of the spring 18 is preferably transmitted by means of the connecting rivets 35 to the cover sheet 7 and, from there, by means of a control plate 40 to the outer cover plate 11 of the idle damper 15.

Viewed in the axial direction, therefore, this system is essentially closed.

In other words, in accordance with a preferred embodiment of the present invention, spring 18 can essentially exert what may be considered a spreading force of cover plate 6 and friction ring 20 with respect to one another, whereupon, by virtue of connecting rivets 35, a force will be exerted on cover plate 7 that will tend to urge the same in an axial direction generally towards the initial position of cover plate 6. Consequently, the axial force exerted on the cover plate 6 will essentially be transmitted to the control plate 40, and thereupon to the outer cover plate 11 of the idle damper 15.

It should be understood that the frictionally engaged connection of spring 18 with cover plate 6 can essentially be obtained in any suitable manner. Also, springs such as spring 18 are generally well-known to those of ordinary skill in the art and will thus not be described in any further detail herein.

The axial guidance of the rotating components is preferably provided by means of the bearing ring 22, which is preferably inserted in an axially fixed position into the cover sheet 6. Bearing ring 22 is preferably pressurized by a zig-zag spring acting as an additional spring 24, preferably being supported on the hub 1, the support force of which is preferably transmitted via the cover sheet 6 and the connecting rivets 35 to the cover sheet 7. From this point, the support force is preferably returned by means of a ring-shaped shoulder 41 which is formed on the inside diameter of the control plate 40, then by means of the hub flange 12, and then back to the hub 1. The hub 1, together with the additional spring 24, the bearing ring 22 and the control plate 40, preferably forms, with the shoulder 41, a friction device with a low coefficient of friction which is active over the entire range of angles of rotation, and in the idle range generates a friction force. In the load range, in addition to this friction force, there is preferably an additional friction force which is generated by the spring 18 by means of the friction ring 20 and the control plate 40.

In accordance with at least one preferred embodiment of the present invention, the axial force provided by zigzag spring 24 can essentially be transmitted in a manner similar to that as described hereabove with relation to spring 18. Generally, zigzag springs such as zigzag spring 24 will be well-known to those of ordinary skill in the art, and thus do not appear to warrant any further description herein.

There is also preferably an entrained friction device 26 which includes the spring 18 with the hub flange 12 and the control plate 40. The control plate 40, as the core of this friction device 26, preferably has several projections 28 which are distributed over its circumference end point axially toward the hub flange 12, which projections are engaged in apertures 30 of the hub flange 12 with at least some circumferential clearance or play.

The function of the clutch disc is as follows, in accordance with a preferred embodiment of the present invention:

During idle operation, the parts of the load damper 14 (i.e. components 6, 7, 9, 2) can essentially be considered a rigid component, moving with respect to the hub 1 in the circumferential direction only within the range of rotation 5 of the toothed portion 4 between the hub disc 2 and the hub 1. Under these operating conditions, the idle damper 15 is essentially pressurized by its energy storage devices 13. The pressure of the energy storage devices 13 is essentially exerted by means of the two cover plates 10 and 11 which are non-rotationally connected to the hub disc 2 on the hub flange 12, which, for its part, is non-rotationally connected to the hub 1.

As explained immediately below, certain components can therefore be considered to be active in the generation of a friction, in accordance with a preferred embodiment of the present invention.

Fundamentally, the friction in question can be considered as being generated by the friction device, being active over the entire range of action of the clutch disc and including the parts 22, 24, 40, with 41 and 1. Essentially, also active in the generation of a friction is the situation occurring when a friction force of the friction device 26 determined by the angle specified during the tuning is exceeded. The main and supplemental friction can act essentially as indicated herebelow:

The control plate 40 is essentially driven by the cover sheet 7, and also by the cover plate 11 which operates in synchronization with control plate 40 during idle operation, as a result of their frictional prestress, or their non-positive, frictionally engaged, connection. The friction force which can be achieved by means of the friction device 26 essentially builds up when the projections 28 of the control plate 40 come into circumferential contact with the apertures 30 of the stationary hub flange 12. Each time there is a reversal of the direction of rotation, first an idle stroke is essentially executed which corresponds to the clearance between the projections 28 and the apertures 30, essentially without the generation of any friction force. As soon as the clutch disc works, or becomes active, in the load range, the range of rotation 5 is essentially completely used up in the toothed portion 4, and the hub disc 2 and the cover plates 10 and 11 of the idle damper 15 should essentially be considered to be non-rotationally connected to the hub 1. Likewise, the control plate 40 should also be considered to be stationary in relation to the hub 1. In this case, the friction essentially includes: the portion which is active between the shoulder 41 of the control plate 40 and the hub flange 12, and generated by the additional spring 24; and the portion which is generated by the spring 18 and between the ring 19 and the hub disc 2 on the friction ring 20, and between the outer cover plate 11 and the control plate 40 on the one hand and between the control plate 40 and the cover sheet 7 on the other hand. It should also be noted that, on the occasion of each reversal of the direction of rotation of the rotating components with respect to the hub 1, the entrained friction device 26 first essentially travels through the clearance angle, or lead angle, and then essentially becomes active again. The friction force can also be easily tuned by using friction rings made of different materials.

Thus, in accordance with at least one preferred embodiment of the present invention, projections 28 will preferably be disposed in apertures 30 with at least some circumferential clearance. That is, in accordance with at least one preferred embodiment of the present invention, apertures 30 will each preferably have a circumferential extent greater than that of corresponding projections 28. In this manner, it will be appreciated that, upon engagement of projection 28 with a circumferential end, or limit, of their corresponding apertures 30, the entrained friction device 26 will become active essentially via simultaneous rotational displacement of control plate 40 and hub flange 12.

Figure 5:
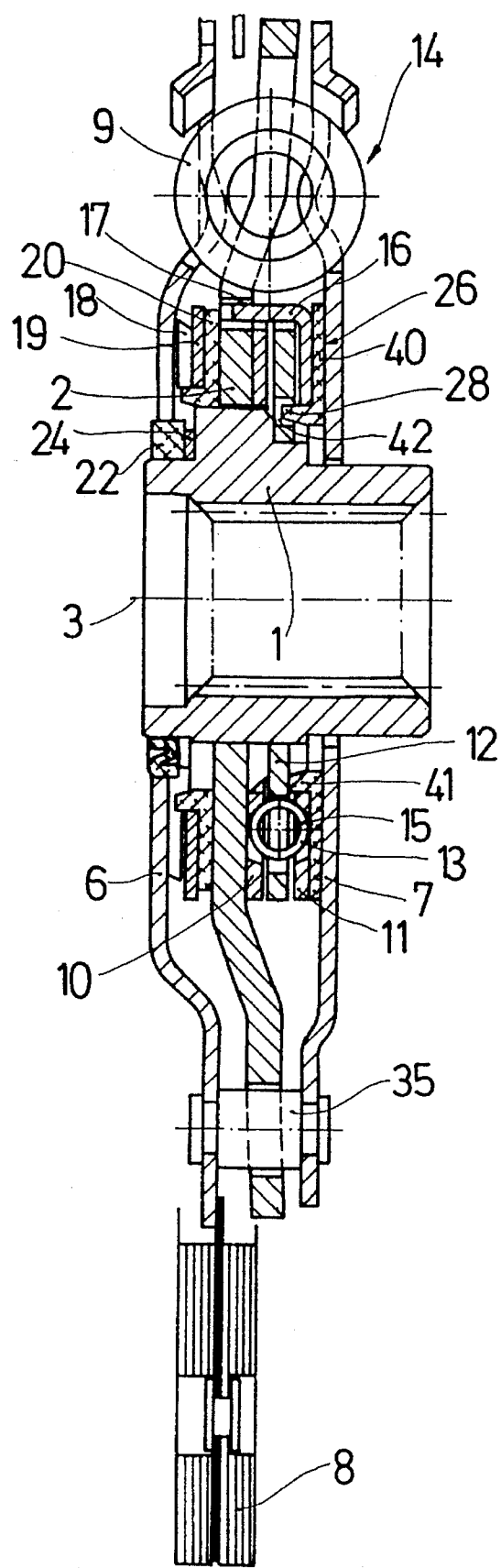
FIG. 5 is essentially the same as FIG. 1, but shows a control plate with axial projections located farther inward radially.

FIG. 5 illustrates another embodiment of a clutch disc according to the present invention, which differs from the embodiment described and illustrated above in that, distributed over the circumference, there are preferably a number of shoulders 41 in the shape of segments of a ring, and which preferably extend in the axial direction to the hub flange, and the projections 28, instead of being located in the circumferential area of the control plate 40, are now essentially located between each two shoulders 41, at essentially the same radial distance, with respect to the axis of rotation 3 of the clutch disc, as the shoulders 41. The projections 28 of the control plate 40 are preferably longer than the shoulders 41 in the axial direction, and preferably project into apertures 42 of the hub flange 12. Since the clutch disc illustrated in the embodiment of FIG. 5 does not essentially differ in any other significant respects from previously described and illustrated embodiments, and since its function is, for the most part, identical, no further details of the embodiment of FIG. 5 are explained here.

Thus, in accordance with at least one preferred embodiment of the present invention, there is preferably an alternation, about the circumference of control plate 40, of shoulders 41 and projections 28, wherein the projections 28 are preferably longer, in the axial direction, than the shoulders 41.

In accordance with at least one preferred embodiment of the present invention, the "zigzag" spring discussed heretofore could conceivably be embodied by a corrugated spring, examples of which would appear to be well-known to those of ordinary skill in the art.

One feature of the invention resides broadly in the clutch disc with a torsional vibration damper for motor vehicle clutches, consisting of a hub for non-rotational mounting on a transmission shaft, a hub disc which is located on a toothed portion with a range of rotation on the hub, cover sheets or cover plates on both sides of the hub disc which are non-rotationally connected to one another and one of which supports the friction linings, energy storing devices for a load damper in apertures of the hub disc and of the cover sheets, an idle damper with cover plates on both sides of a hub flange which is firmly connected to the hub, whereby the non-rotational drive of the two cover plates with respect to the hub disc is accomplished by means of axially oriented tabs of at least one cover plate which are circumferentially engaged without clearance or play in recesses of the hub disc, an axially-acting spring as a part of the load damper, and an entrained or dragged friction device located between one of the cover sheets and the idle damper, consisting of a control plate with axial projections which are engaged in circumferentially larger apertures of the hub flange and are circumferentially offset with respect to the tabs, characterized by the fact that by means of the spring 18 of the load damper 14, the cover plate 11 of the idle damper 15, i.e. the cover plate 11 facing the control plate 40, can be brought into a non-positive connection with the control plate 40, and the latter in turn can be brought into a non-positive connection with the corresponding cover sheet 7.

Another feature of the invention resides broadly in the clutch disc with an axially acting additional spring, by means of which a non-positive connection can be created between a friction element and the hub flange by means of at least one shoulder provided on the friction element, characterized by the fact that the shoulder 41 is located on the control plate 40.

Yet another feature of the invention resides broadly in the clutch disc characterized by the fact that the axial projections 28 of the control plate 40, as well as the tabs 16 on the at least one cover plate 11 are engaged in the circumferential area of the hub flange 12 in the corresponding aperture 30, 42.

Still another feature of the invention resides broadly in the clutch disc characterized by the fact that the axial projections 28 of the control plate 40 are engaged radially inward from the tabs 16 on the at least one cover plate 11 in corresponding apertures 30, 42 of the hub flange 12.

Types of zig-zag springs are disclosed in U.S. Pat. No. U.S. Pat. No. 4,832,320, which issued to Scowen et al. on May 23, 1989; and U.S. Pat. No. 4,778,404, which issued to Pass on Oct. 18, 1988.

Examples of axially-acting springs, plate-type springs, or plate springs, which may be utilized in accordance with the embodiments of the present invention, may be found in the following U.S. Pat. No. 4,844,226, which issued to Taketani on Jul. 4, 1989; U.S. Pat. No. 4,787,492, which issued to Ball et al. on Nov. 29, 1988; U.S. Pat. No. 4,704,554, which issued to Nishimura on Nov. 3, 1987; and U.S. Pat. No. 4,641,736, which issued to Forster on Feb. 10, 1987.

Examples of torsional vibration dampers, and components associated therewith, which may be utilized in accordance with the embodiments of the present invention, may be found in the following U.S. Pat. No. 4,687,086, which issued to Ward on Aug. 18, 1987; and U.S. Pat. No. 4,645,054, which issued to Raab on Feb. 24, 1987.

Examples of clutches, and components associated therewith, which may be utilized in accordance with the embodiments of the present invention, may be found in the following U.S. Pat. No. 5,000,304 to Koch et al.; U.S. Pat. No. 4,941,558 to Schraut; U.S. Pat. No. 4,854,438 to Weissenberger et al.; U.S. Pat. No. 4,741,423 to Hayen; and U.S. Pat. No. 4,715,485 to Rostin et al.

Examples of torsional vibration dampers, and components associated therewith, which may be utilized in accordance with the embodiments of the present invention, may be found in the following U.S. Pat. No. 5,016,744, which issued to Fischer et al. on May 21, 1991; U.S. Pat. No. 4,433,771, which issued to Caray on Feb. 28, 1984; U.S. Pat. No. 4,684,007, which issued to Maucher on Aug. 4, 1987; U.S. Pat. No. 4,697,682, which issued to Alas et al. on Oct. 6, 1987; U.S. Pat. No. 4,890,712, which issued to Maucher et al. on Jan. 2, 1990; and U.S. Pat. No. 4,651,857, which issued to Schraut et al. on Mar. 24, 1987.

Some examples of torsional vibration dampers in which the present invention may be incorporated may be disclosed by the following U.S. Pat. No. 5,230,415 to Ament et al., entitled "Clutch Plate for a Motor Vehicle Friction Clutch"; U.S. Pat. No. 5,251,736 to Jeppe et al., entitled "Clutch Plate for a Motor Vehicle Friction Clutch"; U.S. Pat. No. 5,238,096 to Ament et al., entitled "Clutch Plate for a Motor Vehicle Friction Clutch"; U.S. Pat. No. 4,687,086 to Ward, entitled "Torsional Vibration Dampers"; and U.S. Pat. No. 4,787,612 to Ball et al., entitled "Torsional Vibration Damper".

Some examples of transmissions in which the present invention may be incorporated may be disclosed by the following U.S. Pat. No. 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Four Speed Manual Transmission and Control".

Some examples of clutch assemblies which could possibly be used in conjunction with the present invention may be disclosed in the following U.S. Pat. No. 4,684,007 to Maucher, entitled "Clutch Plate"; U.S. Pat. No. 4,635,780 to Wiggan, entitled "Clutch Disc for a Motor Vehicle Friction Clutch"; and U.S. Pat. No. 4,651,857 to Schraut et al., entitled "Clutch Disc Unit for a Motor Vehicle Clutch".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 07 394.1, filed on Mar. 5, 1994, having inventor Klaus Mammal, and DE-OS P 44 07 394.1 and DE-PS P 44 07 394.1, as well as their published equivalents, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A clutch disc for a motor vehicle clutch, said clutch disc comprising:

a first cover plate;

a second cover plate;

means for substantially fixedly connecting said first and second cover plates with respect to one another;

a hub for connecting with a transmission of a motor vehicle, said hub having a rotational axis defined therethrough;

a hub disc extending radially away from said hub;

said hub disc being disposed axially between said first and second cover plates;

a hub flange being fixedly connected to said hub and extending radially away from said hub;

a load damper arrangement for acting between said hub disc and said first and second cover plates;

an idle damper arrangement for acting on said hub flange;

said idle damper arrangement comprising third and fourth cover plates, said hub flange being disposed axially between said third and fourth cover plates;

means for providing friction between said idle damper arrangement and at least one of said first and second cover plates, said friction means being disposed between said idle damper arrangement and at least one of said first and second cover plates;

said friction means comprising a control plate for engaging with said hub flange;

means for biasing said control plate and at least one of said third and fourth cover plates into frictional engagement with one another;

said biasing means being disposed to act in a direction generally parallel to said rotational axis;

said third cover plate being disposed axially between said hub flange and said hub disc;

said fourth cover plate being disposed axially between said hub flange and said control plate;

said means for biasing said at least one of said third and fourth cover plates into frictional engagement with said control plate comprising means for biasing said fourth cover plate into frictional engagement with said control plate;

said control plate being disposed between said fourth cover plate and said second cover plate;

said biasing means further comprising means for biasing said control plate into frictional engagement with said second cover plate upon said fourth cover plate being biased into frictional engagement with said control plate;

means for permitting a limited range of rotation of said hub and said hub disc with respect to one another;

said load damper comprising a plurality of energy storing devices for acting between said hub disc and said first and second cover plates;

said hub disc, said first cover plate and second cover plate all comprising means for accommodating said energy storing devices;

said hub disc comprising a plurality of recesses disposed therein;

at least one of said third and fourth cover plates comprising axially oriented tabs being circumferentially engaged, substantially without clearance or play, in said recesses of said hub disc, to substantially fixedly connect said at least one of said third and fourth cover plates with respect to said hub disc;

said hub flange comprising circumferentially oriented apertures;

said control plate comprising axial projections being engaged in said circumferentially oriented apertures of said hub flange, each of said apertures describing a greater arc about said rotational axis than does each corresponding axial projection;

said axial projections being circumferentially offset with respect to said tabs;

an axially acting spring;

said axially acting spring having means for biasing said friction means and said hub flange into frictional engagement with one another; and said control plate comprising at least one shoulder for facilitating frictional engagement between said control plate and said hub flange.

2. The clutch disc according to claim 1, wherein:

said at least one shoulder of said control plate is oriented in a generally axial direction; and said at least one shoulder extends axially to make contact with said hub flange.

3. The clutch disc as claimed in claim 2, wherein:

said at least one shoulder comprises an annular extension of said control plate, said annular extension being disposed radially closer to said rotational axis than are said axial projections of said control plate, said annular extension being substantially continuous and unbroken along a circumferential direction of said control plate, said annular extension being centered about said rotational axis;

said tabs extend solely from said fourth cover plate;

said means for permitting a limited range of rotation comprising:

at least one toothed portion disposed on said hub; and means, disposed on said hub disc, for accommodating said at least one toothed portion of said hub and for defining a range of displacement for said at least one toothed portion of said hub, to provide said limited range of rotation;

one of said first and second cover plates comprises means for supporting friction linings; and said idle damper arrangement comprising a plurality of springs for providing damping, in a rotational direction about said rotational axis, between said hub flange and said third and fourth cover plates.

4. A clutch disc for a motor vehicle clutch, said clutch disc comprising:

a first cover plate;

a second cover plate;

means for substantially fixedly connecting said first and second cover plates with respect to one another;

a hub for connecting with a transmission of a motor vehicle, said hub having a rotational axis defined therethrough;

a hub disc extending radially away from said hub;

said hub disc being disposed axially between said first and second cover plates;

a hub flange being fixedly connected to said hub and extending radially away from said hub;

a load damper arrangement for acting between said hub disc and said first and second cover plates;

an idle damper arrangement for acting on said hub flange;

said idle damper arrangement comprising third and fourth cover plates, said hub flange being disposed axially between said third and fourth cover plates;

means for providing friction between said idle damper arrangement and at least one of said first and second cover plates, said friction means being disposed between said idle damper arrangement and at least one of said first and second cover plates;

said friction means comprising a control plate for engaging with said hub flange;

means for biasing said control plate and at least one of said third and fourth cover plates into frictional engagement with one another;

said biasing means being disposed to act in a direction generally parallel to said rotational axis;

said third cover plate being disposed axially between said hub flange and said hub disc;

said fourth cover plate being disposed axially between said hub flange and said control plate;

said means for biasing said at least one of said third and fourth cover plates into frictional engagement with said control plate comprising means for biasing said fourth cover plate into frictional engagement with said control plate;

said control plate being disposed between said fourth cover plate and said second cover plate;

said biasing means further comprising means for biasing said control plate into frictional engagement with said second cover plate upon said fourth cover plate being biased into frictional engagement with said control plate;

means for permitting a limited range of rotation of said hub and said hub disc with respect to one another;

said load damper comprising a plurality of energy storing devices for acting between said hub disc and said first and second cover plates;

said hub disc, said first cover plate and second cover plate all comprising means for accommodating said energy storing devices;

said hub disc comprising a plurality of recesses disposed therein;

at least one of said third and fourth cover plates comprising axially oriented tabs being circumferentially engaged, substantially without clearance or play, in said recesses of said hub disc, to substantially fixedly connect said at least one of said third and fourth cover plates with respect to said hub disc;

said hub flange comprising circumferentially oriented apertures;

said control plate comprising axial projections being engaged in said circumferentially oriented apertures of said hub flange, each of said apertures describing a greater arc about said rotational axis than does each corresponding axial projection;

said axial projections being circumferentially offset with respect to said tabs;

said hub flange comprising an outer circumferential region at a radially outermost portion of said hub flange;

said axial projections of said control plate, as well as said tabs of said at least one of said third and fourth cover plates, being each engaged in a corresponding one of said apertures at said outer circumferential region of said hub flange;

said apertures of said hub flange comprising a first set of apertures and a second set of apertures, said first set of apertures being disposed in alternating fashion about the circumference of said hub flange, at said outer circumferential region of said hub flange, with respect to said second set of apertures;

said axial projections of said control plate being disposed in corresponding ones of said first set of apertures;

said tabs of said at least one of said third and fourth cover plates being disposed in, and extending through, corresponding ones of said second set of apertures;

an axially acting spring;

said axially acting spring having means for biasing said friction means and said hub flange into frictional engagement with one another;

said control plate comprising a shoulder for facilitating frictional engagement between said control plate and said hub flange;

said shoulder of said control plate being oriented in a generally axial direction;

said shoulder extending axially to make contact with said hub flange;

said shoulder comprising an annular extension of said control plate, said annular extension being disposed radially closer to said rotational axis than are said axial projections of said control plate, said annular extension being substantially continuous and unbroken along a circumferential direction of said control plate, said annular extension being centered about said rotational axis;

said tabs extending solely from said fourth cover plate;

said means for permitting a limited range of rotation comprising:

at least one toothed portion disposed on said hub; and means, disposed on said hub disc, for accommodating said at least one toothed portion of said hub and for defining a range of displacement for said at least one toothed portion of said hub, to provide limited range of rotation;

one of said first and second cover plates comprising means for supporting friction linings; and said idle damper arrangement comprising a plurality of springs for providing damping, in a rotational direction about said rotational axis, between said hub flange and said third and fourth cover plates.

5. A clutch disc for a motor vehicle clutch, said clutch disc comprising:
- a first cover plate;
- a second cover plate;
- means for substantially fixedly connecting said first and second cover plates with respect to one another;
- a hub for connecting with a transmission of a motor vehicle, said hub having a rotational axis defined therethrough;
- a hub disc extending radially away from said hub;
- said hub disc being disposed axially between said first and second cover plates;
- a hub flange being fixedly connected to said hub and extending radially away from said hub;
- a load damper arrangement for acting between said hub disc and said first and second cover plates;
- an idle damper arrangement for acting on said hub flange;
- said idle damper arrangement comprising third and fourth cover plates, said hub flange being disposed axially between said third and fourth cover plates;
- means for providing friction between said idle damper arrangement and at least one of said first and second cover plates, said friction means being disposed between said idle damper arrangement and at least one of said first and second cover plates;
- said friction means comprising a control plate for engaging with said hub flange;
- means for biasing said control plate and at least one of said third and fourth cover plates into frictional engagement with one another;
- said biasing means being disposed to act in a direction generally parallel to said rotational axis;
- said third cover plate being disposed axially between said hub flange and said hub disc;
- said fourth cover plate being disposed axially between said hub flange and said control plate;
- said means for biasing said at least one of said third and fourth cover plates into frictional engagement with said control plate comprising means for biasing said fourth cover plate into frictional engagement with said control plate;
- said control plate being disposed between said fourth cover plate and said second cover plate;
- said biasing means further comprising means for biasing said control plate into frictional engagement with said second cover plate upon said fourth cover plate being biased into frictional engagement with said control plate;
- means for permitting a limited range of rotation of said hub and said hub disc with respect to one another;
- said load damper comprising a plurality of energy storing devices for acting between said hub disc and said first and second cover plates;
- said hub disc, said first cover plate and second cover plate all comprising means for accommodating said energy storing devices;
- said hub disc comprising a plurality of recesses disposed therein;
- at least one of said third and fourth cover plates comprising axially oriented tabs being circumferentially engaged, substantially without clearance or play, in said recesses of said hub disc, to substantially fixedly connect said at least one of said third and fourth cover plates with respect to said hub disc;
- said hub flange comprising circumferentially oriented apertures;
- said control plate comprising axial projections being engaged in said circumferentially oriented apertures of said hub flange, each of said apertures describing a greater arc about said rotational axis than does each corresponding projection; and
- said axial projections of said control plate being disposed radially closer to said rotational axis than are said tabs of said at least one of said third and fourth cover plates.

6. The clutch disc according to claim 5, wherein:
- said apertures of said hub flange comprise a first set of apertures and a second set of apertures;
- said first set of apertures are disposed radially closer to said rotational axis than are said second set of apertures;
- said axial projections of said control plate being disposed in corresponding ones of said first set of apertures; and
- said tabs of said at least one of said third and fourth cover plates being disposed in, and extending through, corresponding ones of said second set of apertures.

7. The clutch disc according to claim 6, further comprising:
- an axially acting spring;
- said axially acting spring having means for biasing said friction means and said hub flange into frictional engagement with one another;
- said control plate comprising a plurality of shoulders for facilitating frictional engagement between said control plate and said hub flange;
- said plurality of shoulders of said control plate being oriented in a generally axial direction;
- said plurality of shoulders extending axially to make contact with said hub flange;
- said plurality of shoulders being distributed in alternating fashion with respect to said axial projections along a circumferential direction of said control plate;
- said tabs are circumferentially offset with respect to said axial projections;
- said tabs extend solely from said fourth cover plate;
- said means for permitting a limited range of rotation comprising:
  - at least one toothed portion disposed on said hub; and
  - means, disposed on said hub disc, for accommodating said at least one toothed portion of said hub and for defining a range of displacement for said at least one toothed portion of said hub, to provide limited range of rotation;
- one of said first and second cover plates comprises means for supporting friction linings; and
- said idle damper arrangement comprising a plurality of springs for providing damping, in a rotational direction about said rotational axis, between said hub flange and said third and fourth cover plates.

* * * * *

UNITED STATES PATENT AND TRADEMARK OFFICE
CERTIFICATE OF CORRECTION

PATENT NO. : 5,595,276

DATED : January 21, 1997

INVENTOR(S) : Klaus MEMMEL

It is certified that error appears in the above-indentified patent and that said Letters Patent is hereby corrected as shown below:

In column 4, line 10, after 'rivets' insert --35.--.

In column 5, line 49, after 'circumference', delete "end" and insert --and--.

In column 8, line 61, before 'entitled', delete "Wiggan," and insert --Wiggen,--.

In column 9, line 12, after 'Klaus', delete "Mammal," and insert --Memmel,--.

Signed and Sealed this

Twenty-second Day of April, 1997

Attest:

BRUCE LEHMAN

*Commissioner of Patents and Trademarks*

*Attesting Officer*